Jan. 12, 1965  J. B. VAN DER WINDEN  3,165,055
APPARATUS FOR THE CONTINUOUS STERILIZATION OR
PASTEURIZATION OF FOODSTUFFS
PACKED IN CONTAINERS
Filed May 2, 1960                          5 Sheets-Sheet 1

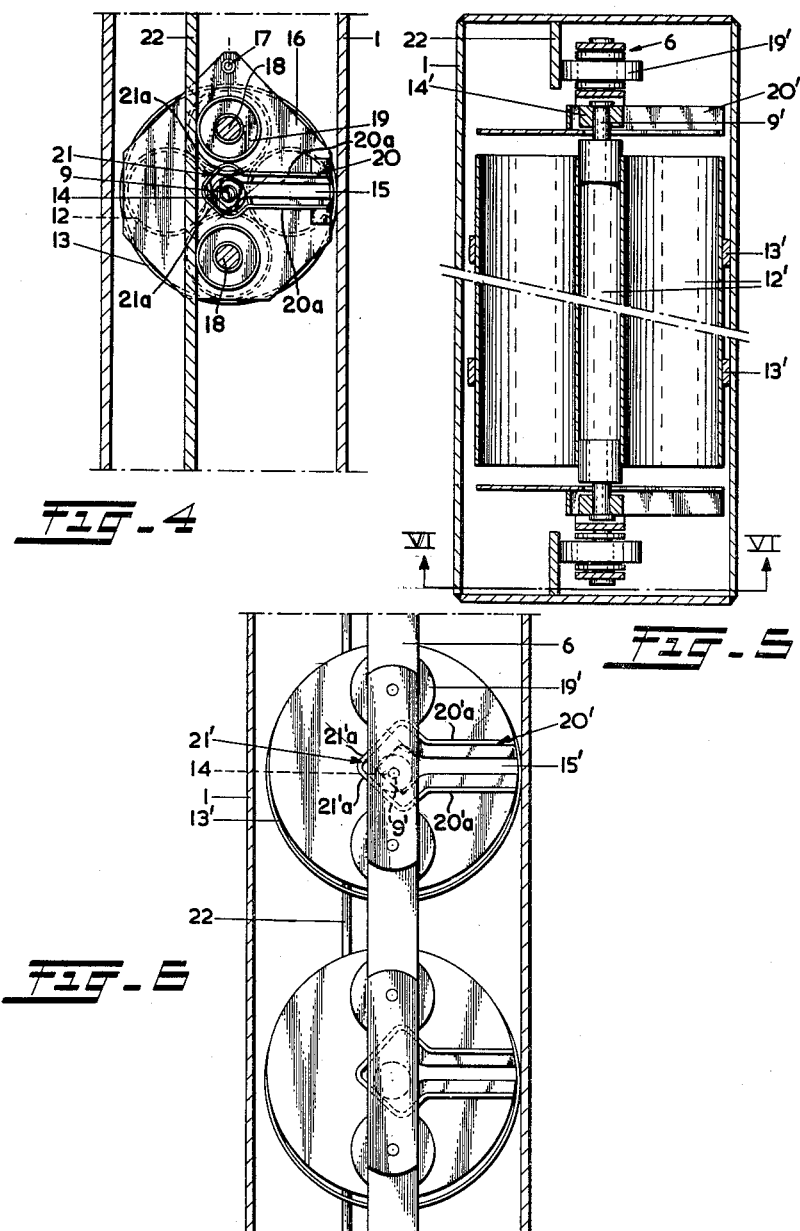

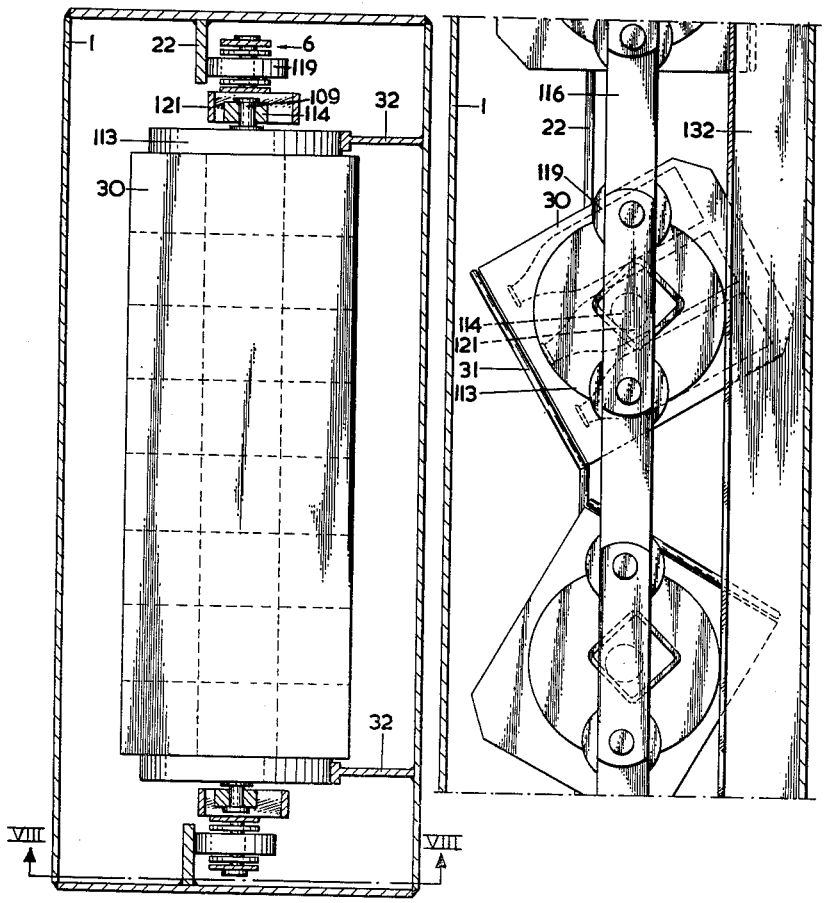

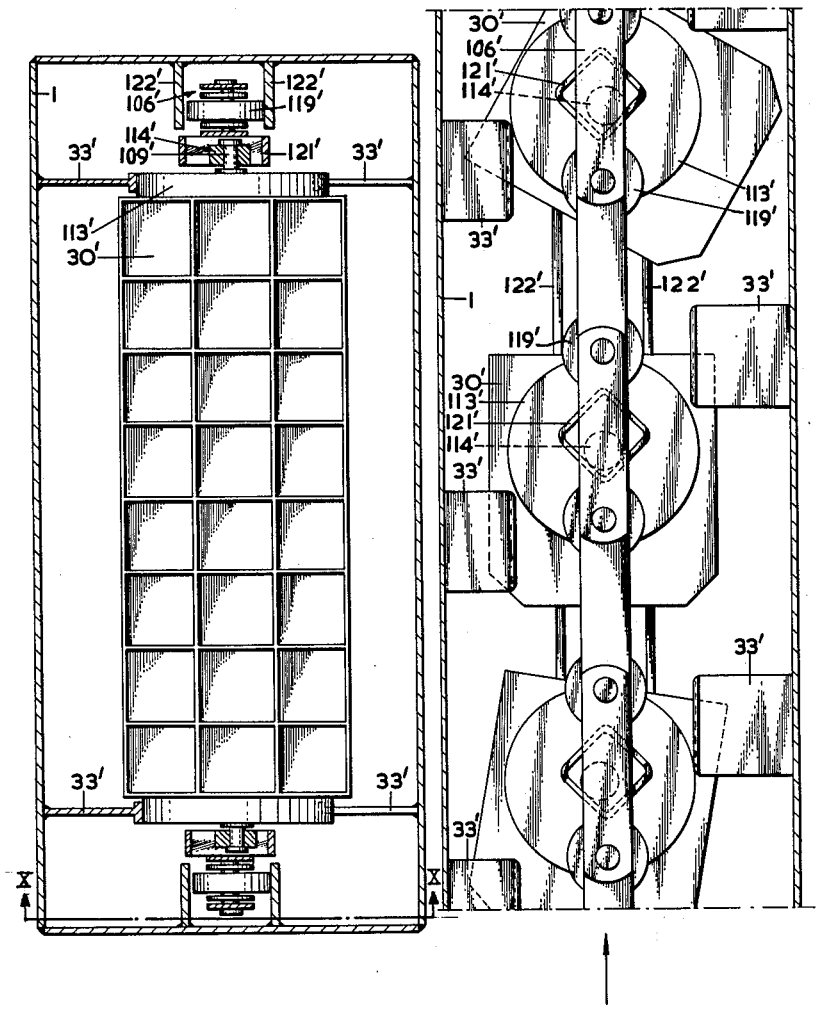

3,165,055
APPARATUS FOR THE CONTINUOUS STERILIZATION OR PASTEURIZATION OF FOODSTUFFS PACKED IN CONTAINERS
Johannes B. van der Winden, Nieuwer Amstel, Netherlands, assignor to Gebr. Stork & Co's Apparatenfabriek N.V., Amsterdam, Netherlands, a corporation of the Netherlands
Filed May 2, 1960, Ser. No. 26,169
Claims priority, application Netherlands May 2, 1959
6 Claims. (Cl. 99—362)

The invention relates to an apparatus for the continuous sterilization or pasteurization of foodstuffs packed in containers. The containers are carried in carriers which advance conveyor. The conveyor moves through a pasteurization zone in which it is desirable for the carriers to rotate as they move therethrough. Apparatus of this kind is disclosed in the Dutch patent specification No. 74,150. According to this patent the means for causing the carriers to rotate consist of a chain which is substantially parallel to the track of the conveyor, said chain co-operating with gear wheels which are connected with the carriers.

The object of the present invention is to furnish a machine of lower cost price, viz. by providing means for causing the carriers to rotate, which can be constructed in a simple way. This object is attained according to the invention by turning means consisting of one or more rings connected with the carriers, which rings are arranged coaxially with horizontal supporting shafts of the carrier. Further provided is at least one reaction roller fitted on the conveyor near the point of support of each of the carriers, and of two supporting surfaces facing one another and connected with the housing of the apparatus. The ring and reaction roller of each carrier respectively are at least periodically in rolling engagement. The supporting surfaces are substantially parallel to the ascending and descending parts of the conveyor. By this measure the turning movement is obtained with very simple elements.

In the construction described above the supporting shafts can be mounted directly on bearings in the conveyor. When the distance between the two facing supporting surfaces varies, the possibility exists that the rolling engagement of the rings on the one hand and the rollers on the other is not ensured. In order to avoid this possible difficulty, in a preferred embodiment of the apparatus according to the invention each of the supporting shafts is supported at both ends with ample play by an intermediate element connected with the conveyor, which element is fitted with a supporting flange for the corresponding end of the shaft. The supporting flange has an active section which is V-shaped, each of the limbs of the V being inclined with the longitudinal direction of the conveyor. Furthermore the V-shaped supporting flange diverges towards the supporting surface of the housing co-operating with the ring of the carrier. Through this measure the carriers will be lowered along the inclined supporting edge, by their own weight, in the downward and the lateral direction until the rings engage the corresponding supporting surface and the reaction rollers are pressed into engagement with their supporting surface. The V-shape of the supporting flange is designed to cause this combined downward and lateral displacement in the ascending as well as the descending parts of the track of the conveyor.

The invention will be explained more fully with reference to the drawing, in which a number of embodiments of the apparatus according to the invention are illustrated.

FIG. 4 is a sectional view taken along line IV—IV in FIG. 3 with the conveyor eliminated for purposes of clarity.

FIG. 5 is a section through another embodiment of the system of carriers shown in a manner similar to FIG. 2.

FIG. 6 is a side elevation along the line VI—VI in FIG. 5.

FIG. 7 is a view of a further embodiment of the system of carriers shown in a manner similar to FIG. 2.

FIG. 8 is a side elevation along the line VIII—VIII in FIG. 7.

FIG. 9 is a view of a still further embodiment of the system of carriers shown in a manner similar to FIG. 2, and FIG. 10 is a side elevation of the embodiment in FIG. 9 along the line X—X therein.

Figure 1:
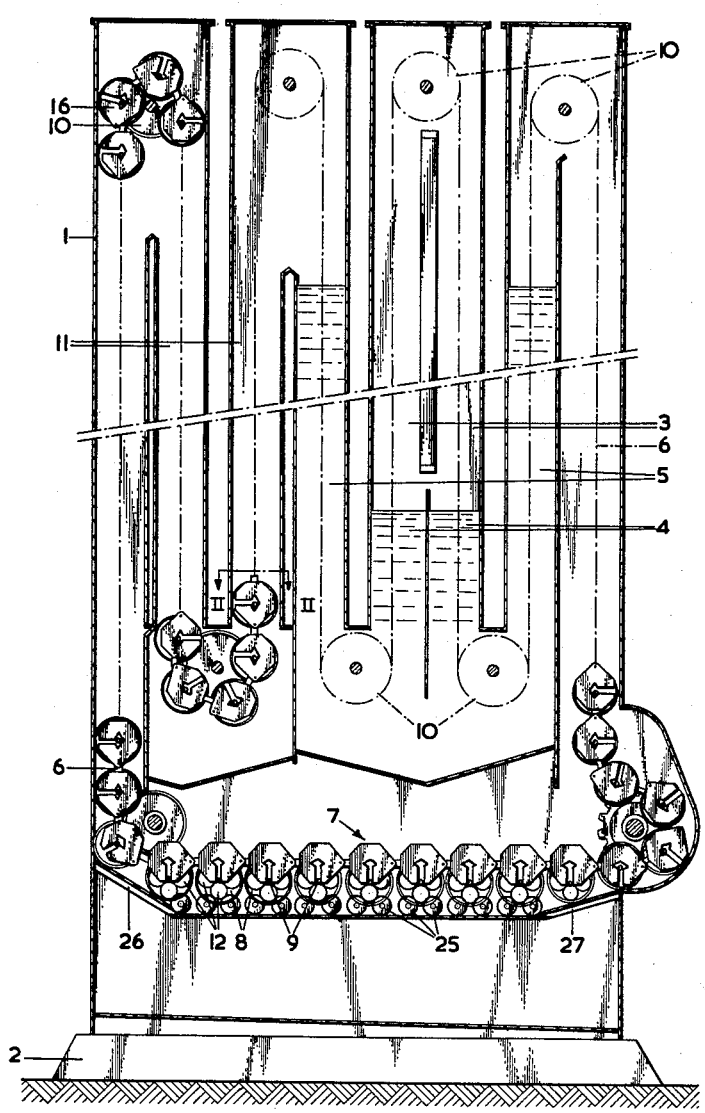
FIGURE 1 is a section of an embodiment of the apparatus according to the invention shown in side elevation.

As can be seen in FIGURE 1, the apparatus consists of a housing 1 defining a plurality of vertical chambers resting upon a base 2. Inside the housing there is a steam chamber 3, which is in open communication at both ends with the short limb 4 of a liquid seal 5 in the form of a U-tube. An endless conveyor 6 moves through the vertical chambers in alternating upward and downward paths. The conveyor forms a closed circuit by the horizontal portion 7 which connects the exit from the last vertical chamber with the entrance to the first vertical chamber. This conveyor is provided with carriers 8 which are rotatably suspended from horizontal supporting shafts 9. The conveyor moves through a path in the housing, which path is substantially vertical. A plurality of pulleys 10 reverse the direction of the endless conveyor. Adjacent steam chamber 3 there is a liquid chamber 11, through which the conveyor passes. This chamber serves to bridge the difference in temperature between the steam chamber and the atmosphere.

Figure 2:
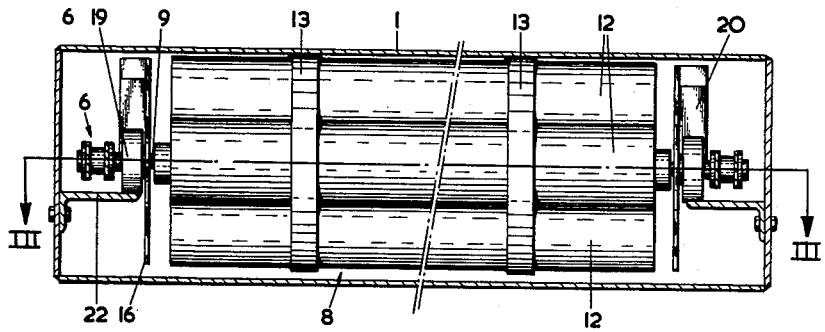
FIG. 2 is a sectional view taken along line II—II in FIG. 1.
Figure 3:
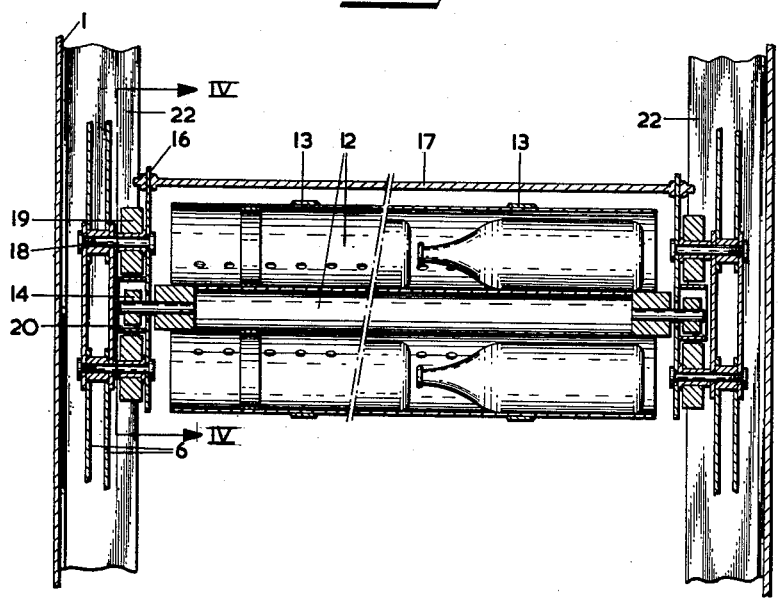
FIG. 3 is a sectional view taken along line III—III in FIG. 2.

As seen in FIGURES 2–4, the carriers 8 include four tubes 12, which may be perforated and which are held together by two rings or hoops 13, which are arranged coaxially with the horizontal supporting shafts 9. At the free end of each of shafts 9, which have the form of stub axles, roller means constituted by a supporting roller 14 is provided. Each of the shafts 9 rests with ample play in a slot 15 of a plate-shaped intermediate element 16, which is provided at either end of the shaft. The two elements 16 are interconnected by a rod 17. Furthermore each of the elements 16 is connected at two points on either side of the slot 15 to the conveyor 6 by means of pins 18. Mounted on each pin is a reaction roller 19 in a space between the respective element 16 and the conveyor 6.

Each of the intermediate elements is provided with a supporting flange 20 which projects from the elements 16, which flange 20 is adapted for supporting roller 14 thereon. The supporting flange 20 includes flat parallel portions 20a and limbs 21a. Limbs 21a define a V-shaped portion 21 which is part of a rhomboid connected to the two flat portions 20a. This is best seen in FIGS. 4 and 6. The rhomboid portion is located centrally with respect to the intermediate elements 16 and the parallel portions 20a extend to an edge of the intermediate elements. The slot 15 is formed in the elements 16 within the outline of supporting flange 20. The slot 15 is of sufficient size relative to the diameter of roller 14, the placement of supporting flange 20 and the diameter of shaft 9 such that the supporting roller 14 moves along the supporting flange without the supporting shaft 9 coming into contact with the intermediate plate 16 at the side of the slot 15. Stated otherwise, the shaft 9 is always spaced in the slot 15.

The active part of the supporting flange 20 consists of the V-shaped section 21 defined by the limbs. Each limb 21a forms an angle less than 90° with the longitudinal direction of the conveyor 6. This inclined position of the limbs 21a is designed to cause the carriers to move downward and at the same time in a lateral direction by their own weight against one of the limbs 21a (see FIGURE 4), until the rings 13 engage housing 1. The reaction force which is exerted via the supporting roller 14 upon each of the intermediate elements 16 and thus upon the conveyor 6 is resisted by reaction rollers 19, which rest against a supporting surface 22 which is fastened to the inside of the housing 1. The supporting surface 22 ensures that the conveyor 6 and the intermediate elements 16 connected therewith remain in a position approximately in the middle of the chambers in the housing. The carriers therefore adapt themselves to the distance between the two co-operating supporting surfaces, viz., the surface 22 and the housing 1. As the carriers pass through the various vertical chambers of the housing each of the carriers will adjust itself continuously in relation to the respective intermediate elements 16, while the supporting roller 14 moves along the limbs 21a of the supporting flange 20. The limbs 21a define a V-shape, which diverges in a direction away from the supporting surface 22 whereby one of the limbs 21a will support the corresponding roller 14 for upward movement of the carrier in a compartment while the other of the limbs 21a will support the roller 14 for downward movement of the carrier in a compartment.

Due to the engagement of the rings 13 with the wall of the housing as well as through the rotatable support of the carriers 8 the latter turns slowly as the conveyor travels along the path. The required engagement of the rings 13 with the wall of the housing is ensured at all times by the adjustable support of the rollers 14 of the carriers 8 on the limbs 21a on the intermediate elements 16 and by the component of force in the lateral direction developed as a result of the weight of the carriers and the sloping position of the limbs 21a of the supporting flange 20. In addition to the portion within the rhomboidal portion of the supporting flange 20, the slot 15 has a laterally directed part in line with the axis of symmetry of the V-shaped section and opening at the side of the intermediate element 16. By this means the carriers 8 can be easily introduced and removed from the conveyor. During the travel of the carrier through the path in the housing, the lateral portion of the slot varies between a position opening horizontally or vertically upwards. Consequently, the stub axles 9 of the carrier can't slide through this slot, as a result of which the carrier 8 would leave the space between the two intermediate elements 16. It is only in one part of the path of the conveyor, viz. the horizontal portion 7 situated near the base 2, where the carriers are permitted to leave the space bounded by the intermediate elements 16.

As can be seen in FIGURE 1, a roller track 25 has been provided for this purpose. The rollers are arranged in such a way that the tubes 12 of the carriers 8 engage the rollers thereby leaving the hoops 13 freely supported and clear of roller track 25. The distance between the roller track 25 and the portion of the conveyor present in path 7 is such that the carriers drop down and partly leave the space between the associated and interconnected intermediate elements 16, while the supporting shaft 9 of each of the carriers continues to engage the elements 16 at the end of the slot 15. Connected with the roller track on either side are sloping portions 26 and 27 for gradually conducting the carriers from the central to the eccentric position and vice versa.

When the carrier 8 rests upon the roller track 25, the tube 12 which is in engagement with the rollers will for a certain period of time be subjected no longer to a translation but exclusively to a rotation, until the adjoining tube engages the next roller. During this time the conveyor travels normally in the forward direction and in doing so carries along the supporting shaft 9 of the carrier via the slot 15. Owing to the fact that each tube stands still for some time there is now an opportunity to feed and discharge it without the necessity of the travel of the conveyor being interrupted. The feeding and discharge is achieved in the usual way by means of pushers (not shown in the drawing) adapted to move at right angles to the track 7.

In FIGURES 5–10 three variants of the carriers 8 and of the turning mechanism are shown. The embodiment according to FIGURES 5 and 6 has the greatest similarity to the carrier according to FIGURES 2–4. Again the carrier consists of four tubes 12' which are held together by two hoops 13'. The supporting shaft 9' at both ends has a supporting roller 14' resting upon the supporting flange 20' having flat parallel portions 20a' and limbs 21a' defining V-shaped portions 21'. Each of the intermediate elements 16' is provided with a slot 15' bounded by the flange 20', all in conformity with the embodiment according to FIGURES 2–4. The difference consists in that the reaction rollers 19' are placed further outwards than in the embodiment in FIGS. 2–4. This is brought about by placing each roller 19' between the links of the conveyor chain 6. A couple is developed between the reactions on the rollers 14' and 19', owing to which the conveyor 6 is locally subjected to a twisting load. This is avoided in the embodiment according to FIGURES 2–4 because therein the rollers 14 and 19 lie substantially in the same plane.

The embodiments according to FIGURES 7–10 relate to a carrier of a different type. This has the form of a tank 30, in which the containers are placed in a direction at right angles to the axis of revolution. The tank 30 is closed with a lid 31, so that during rotation of the tank the containers will not fall out of the tank.

The rings 13 which cause the turning movement are not mounted round the carrier since this would obstruct feeding and discharge of the containers therefrom. Thus, the rings 113 have been fitted against the side of the carrier, and in the case of the embodiment shown in FIGS. 7 and 8, the supporting surface co-operating with these rings is formed by a ledge 32 fitted against the inner wall of the housing. The remaining construction is similar to that shown in FIGURES 5 and 6. The containers (usually bottles) which are enclosed in this carrier are turned end-over-end during advancement of the carriers during the sterilization process, in contrast to the containers in the carrier according to FIGURES 2–6, which are turned while the horizontal position of their axes is maintained.

The carrier according to FIGURES 9 and 10 is similar to that according to FIGURES 7 and 8, with the difference that the lid 31 may be omitted. In this case the supporting surface with which the rings 113' co-operate is subdivided into a number of short tracks lying alternately to one side and the other of the conveyor. These tracks are formed by short ledges 33' of such length (seen in the direction of travel of the conveyor) that an open space is present between every two successive ledges. The supporting surface 122' with which the rollers 119' co-operate is constructed as two parallel members and is present over the whole length of the compartment in question. By means of the above mentioned arrangement it is ensured that as a carrier advances in the compartments, it receives alternately a tilting movement to the left and to the right, while between the two movements the carrier owing to gravity resumes a normal vertical position. The oscillation in this case may extend over an arc of about 120°, i.e. 60° to one side and 60° to the other side.

What I claim is:

1. Apparatus comprising a housing including walls defining a plurality of vertical chambers, conveyor means, means for moving the conveyor means in alternating ascending and descending paths in said vertical chambers, a carrier, a shaft rotatably supporting said carrier, a ring rigid with said carrier and co-axial with said shaft and means operatively coupled to said shaft and said conveyor means for causing advancement and rotation of the carrier along said path under the influence of the conveyor means, the last said means comprising at least one reaction roller mounted for movement with the conveyor means, a supporting surface in said housing extending through said chambers in spaced relation from the walls of the housing and substantially parallel thereto, said last means including means supporting the shaft of the carrier and the reaction roller such that said ring which is rigid with the carrier and the reaction roller are respectively in rolling engagement with the walls of the housing and the supporting surface, whereby as said conveyor means is advanced said carrier is rotated as the ring rolls along said walls of the housing, said means supporting the shaft comprising an intermediate element including a supporting flange for supporting the shaft, said flange having a section including limbs arranged in the form of a V, said limbs being acutely inclined with respect to the path of the conveyor means and diverging in a direction away from the supporting surface in the housing, said shaft being slidably and rotatably supported on said limbs.

2. Apparatus as claimed in claim 1 wherein said carrier comprises a plurality of parallel tubes, and said ring encircles said tubes and connects the same together.

3. Apparatus as claimed in claim 1 comprising a supporting roller on said shaft in contact with the supporting flange and located in a common plane with the reaction roller.

4. Apparatus as claimed in claim 3 wherein said limbs of said supporting flange define a portion of a rhomboid having opposite angles aligned substantially in the direction of travel of the carrier, said intermediate element being provided with a slot symmetrically positioned with respect to the V shape of the limbs and extending therefrom in a direction transverse to the direction of travel of the carrier and opening externally of the intermediate element whereby the shaft and the carrier may be replaced in the intermediate elements.

5. Apparatus as claimed in claim 4 wherein said conveyor means moves in a horizontal path between at least two vertical chambers, a roller track in said horizontal path supporting said carrier and leaving the ring freely suspended, the roller track being spaced from said conveyor means and in parallel relation therewith, said carrier having a determinable radius, the sum of the radius of the carrier and the length of the slot being greater than the spacing between the conveyor means and the roller track.

6. Apparatus comprising a housing including walls defining a plurality of vertically disposed chambers, said chambers defining a substantially vertical path, an endless conveyor in said housing adapted to move along said path, said conveyor including two spaced parallel chains, a plurality of tubular carriers, a pair of interconnected intermediate plate elements for each carrier secured to respective chains and movable therewith, each of said elements being provided with a slot, a supporting shaft rotatably supporting each of said carriers between the chains, said shafts each projecting through the slots of a corresponding pair of intermediate plate elements, a supporting flange on each of the plate elements bounding the slot therein, roller means on the supporting shafts for contacting the supporting flanges of the associated intermediate elements for supporting each carrier from the associated intermediate elements while enabling limited relative movement between each carrier and the associated intermediate elements in a direction transverse of the direction of movement of the intermediate elements, said supporting flanges having an inclination relative to the direction of travel of the intermediate elements, said roller means being rotatably and slidably supported on said flanges such that upon vertical movement of the conveyor, the carriers are urged against the housing, thereby causing the carrier to rotate as the same advances with the intermediate elements along said path.

References Cited by the Examiner
UNITED STATES PATENTS

| | | | |
|---|---|---|---|
| 2,107,890 | 2/38 | Frank. | |
| 2,124,010 | 7/38 | Smith et al. | 99—362 |
| 2,695,555 | 11/54 | Carvallo | 99—362 |
| 2,741,978 | 4/56 | Cheftel et al. | 99—362 X |
| 2,806,423 | 9/57 | Winden | 99—362 |

JEROME SCHNALL, *Primary Examiner.*

GEORGE A. NINAS, JR., *Examiner.*